United States Patent [19]

Misumi et al.

[11] Patent Number: 4,530,490

[45] Date of Patent: Jul. 23, 1985

[54] FIBER-REINFORCED PLASTICS LEAF SPRING

[75] Inventors: Atsushi Misumi; Shuji Hiromoto, both of Yokohama, Japan

[73] Assignee: NHK Spring Co., Ltd., Yokohama, Japan

[21] Appl. No.: 520,077

[22] Filed: Aug. 3, 1983

[30] Foreign Application Priority Data

Aug. 20, 1982 [JP] Japan .............................. 57-125586[U]

[51] Int. Cl.³ ................................................ F16F 1/20
[52] U.S. Cl. ....................................... 267/47; 267/149
[58] Field of Search ..................... 29/173; 267/47, 148, 267/149

[56] References Cited

U.S. PATENT DOCUMENTS 2,969,971 1/1961 Nelson ................................. 267/149
3,142,598 7/1964 Rosen .
3,376,033 4/1968 Sherwood .
3,530,212 9/1970 Kienle et al. .
3,968,958 7/1976 Huchette et al. ................ 267/149 X

FOREIGN PATENT DOCUMENTS 47-32270 11/1972 Japan .
54-25986 2/1979 Japan .
56-120905 9/1981 Japan .
0163741 10/1982 Japan .................................... 267/47

OTHER PUBLICATIONS

SAE Technical Paper Series, Design of the Hollow Stabilizer, Kanji Inoue et al., NHK Spring Co. Ltd., 1982.
SAE Technical Paper Series, Study of Hollow Stabilizer Bar, Shoji Matsuki, Horikiri Spring Mfg. Co., Ltd., 1979.

*Primary Examiner*—Duane A. Reger
*Attorney, Agent, or Firm*—Frishauf, Holtz, Goodman & Woodward

[57] ABSTRACT

An FRP leaf spring wherein finer continuous fibers are embedded in that thickness range of the leaf spring to which tension stress is applied, and continuous fibers of greater diameters are embedded in that thickness range of the leaf spring to which compression stress is applied.

10 Claims, 10 Drawing Figures

FIBER-REINFORCED PLASTICS LEAF SPRING

BACKGROUND OF THE INVENTION

This invention relates to a fiber-reinforced plastics leaf spring (hereinafter referred to as "an FRP leaf spring") which is constructed by embedding a plurality of continuous fibers bearing prescribed different thicknesses or diameters in a plastics material in a predetermined distribution.

The plastics material of the conventional leaf spring of the above-mentioned type is chiefly prepared from thermosetting resin. The continuous fiber (simply referred to as "a fiber") of said leaf spring is mainly formed of a glass fiber having a diameter of 10 to 25 microns. The conventional leaf spring comprises a large number of glass fibers which continuously extend in a prescribed length along the prescribed lines defined in the leaf spring. Such an FRP leaf spring has come to be widely accepted, for instance, for the suspension in rolling stock. Consequently, there has been a strong demand to solve problems related to improvements in durability, particularly at elevated temperatures. A decline in the high temperature durability of the conventional FRP leaf spring results from the fact that when said leaf spring is subjected to a temperature of 40° to 100° C. or higher, the fibers contained in the leaf spring tend to buckle on that side of the leaf spring on which compression stress occurs.

The present inventors have conducted studies for resolution of the aforementioned drawbacks, and experimentally discovered that finer fibers contained in the FRP leaf spring assure higher durability at room temperature, while fibers of larger diameter used on that side of the FRP leaf spring which undergoes compression improves the durability of said leaf spring at a high temperature. Brief description will now be given of the experimental data. The inventors provided three sample leaf springs which respectively comprised continuous fibers measuring 13, 17 and 23.5 microns in diameter which equally measure 7 mm in thickness, 20 mm in width and 300 mm in length. The fibers are distributed through the leaf spring substantially in the same manner. The samples were subjected to a durability test substantially similar to process A specified in ASTM 671-63T, obtaining the results below (number of cycles) from the repeated load test. Results of the tests are as follows.

| Result | Diameter of fiber |
|---|---|
| $71 \sim 100 \times 10^4$ | 13 μm |
| $37 \sim 85 \times 10^4$ | 17 μm |
| $44 \sim 79 \times 10^4$ | 23.5 μm |

The above experiment showed that the leaf spring including finer fibers proved more durable. Similar tests to those described above were carried out on another sample leaf spring which had the same measurements as described above and was constructed by embedding fibers of 13 micron diameter from the surface on which a tensile stress occurred to a depth of about 2 mm from said surface, and embedding fiber of 17 micron diameter in the other regions of the leaf spring. From the above-mentioned experiment, a result of $(65 \text{ to } 90) \times 10^4$ is obtained. On the other hand, the first mentioned three sample leaf springs were subjected to a high temperature test at 60° C., giving the following results. A sample leaf spring comprising fiber of 13 micron diameter withstood $(40 \text{ to } 58) \times 10^4$ load tests. A sample leaf spring composed of two kinds of fibers having diameters of 13 and 17 microns withstood $(51 \text{ to } 82) \times 10^4$ load tests. The latter experiment proved that when a compression stress was applied at high temperature, larger diameter fibers embedded in that region of the leaf spring in which a compression stress was applied ensured the higher durability of the leaf spring. The above-mentioned experimental results are derived from the fact that the resin softens at high temperature and grips fibers with a weaker force, tending to give rise to the buckling of the fibers, but that the application of larger diameter fibers on that side of the leaf spring on which a compression stress is applied increases the force resisting the buckling of the fibers.

Consideration should be given to the following points in manufacturing a FRP leaf spring. Finer fibers should be applied in a larger number than fibers of greater diameter, in order to ensure a sufficiently large volume. For example, where a leaf spring is manufactured by employing reinforcing fibers having a larger diameter, the number of fibers required is smaller than the number of fibers required where the same leaf spring is manufactured by employing finer reinforcing fibers. Therefore, the manufacturing efficiency becomes high when the larger-diameter fibers are employed. However, provision of finer fibers is accompanied with difficulties in bundling, twisting or properly arranging individual fibers, and since the interfiber space is narrow, it is difficult to impregnate resin fully to the corners of said interfiber space. This means that the continuous manufacture of a FRP hoop for making the leaf spring from finer fibers, is unavoidably carried out at a lower speed than when producing the FRP leaf spring from fibers of greater diameter fibers.

SUMMARY OF THE INVENTION

It is accordingly an object of this invention to provide a FRP leaf spring of high durability which, even when used in high temperature applications, is saved from a decline in durability resulting from fiber buckling.

To attain the above-mentioned object, this invention provides a FRP leaf spring, in which continuous fibers embedded therein have different diameters chosen according to the position occupied by the fiber along the thickness or cross-section of said leaf spring.

The embeding of fibers of different diameters in the prescribed regions of a leaf spring in accordance with this invention offers the advantages that finer fibers elevate the durability of the leaf spring at room temperature, larger diameter fibers are prevented from buckling at high temperature, and fiber arrangement and resin impregnation can be effected with a greater ease than when the leaf spring is formed of fine fibers alone, thereby ensuring high-speed continuous manufacture.

In a preferred embodiment of the invention, fibers of larger diameter are embedded in that region of a leaf spring in which a compression stress arises, and finer fibers are provided in regions of the leaf spring other than those in which the larger diameter fibers are embedded.

DETAILED DESCRIPTION OF THE PREFERRED EMBODIMENTS

Figure 1:
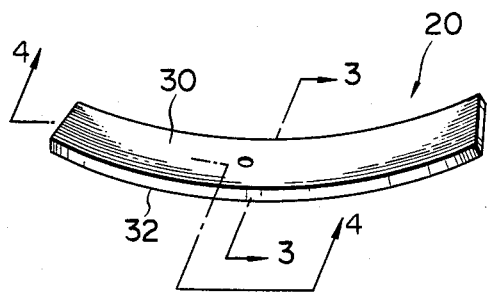
FIG. 1 is a perspective view of a FRP leaf spring embodying this invention.
Figure 2:
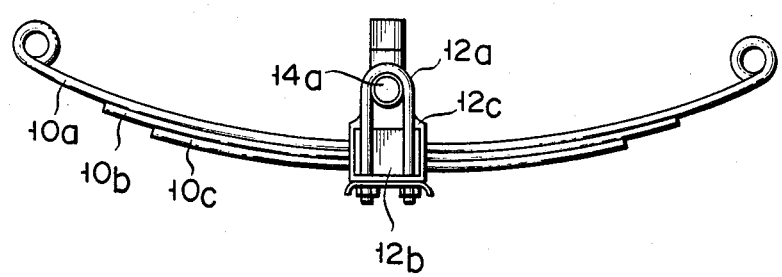
FIG. 2 illustrates the leaf spring of FIG. 1 applied for the suspension of rolling stock.
Figure 3:
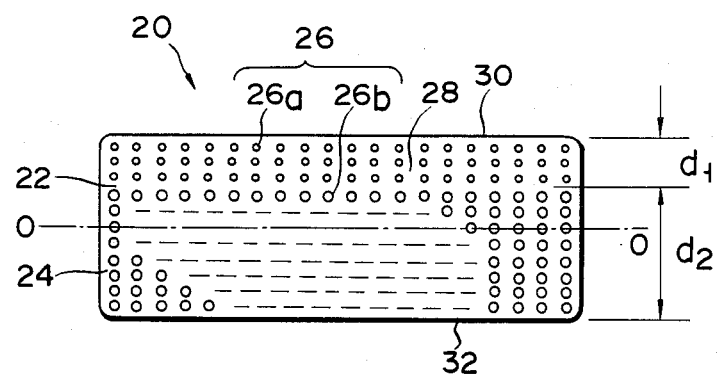
FIG. 3 is an enlarged cross sectional view on line 3—3 of FIG. 1.
Figure 7:
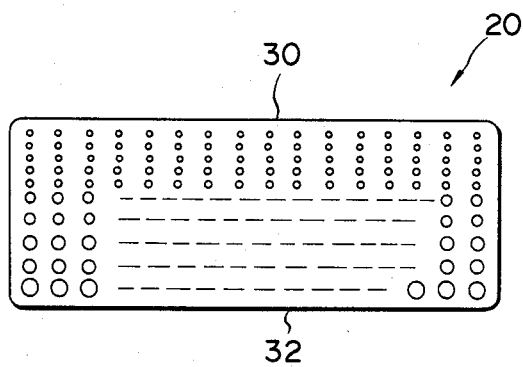

FIG. 1 illustrates an FRP leaf spring 20 embodying the present invention, which spring is in a free state. This leaf spring 20 is adapted for use as the suspension in, for example, rolling stock. FIG. 2 indicates a rolling stock suspension including a plurality of superposed FRP leaf springs embodying this invention. The suspension comprises the uppermost main leaf 10a which is longest, bends downward and is provided with a lug at both ends, and second leaf 10b and third leaf 10c which are made successively shorter than the uppermost leaf 10a and underlie it in succession. The suspension is tightened at the center by a U-shaped bolt 12a, pad 12b and retainer 12c. The suspension is connected to an axle housing 14a by means of the U-shaped bolt 12a and fitted to the frame (not shown) of the rolling stock by means of the lugs provided at both ends of the suspension. The leaf spring 20 of FIG. 1 corresponds to any of the three leaf springs 10a, 10b, 10c of FIG. 2. When the suspension is attached to the rolling stock, the leaf spring 20 of FIG. 1 is subjected at both ends to a downward force with the central portion of the spring supported. As seen from FIG. 3, therefore, tensile stress is applied to the upper portion 22 of the leaf spring 20 as measured from the neutral axis O—O, and a compression stress is applied to the lower portion 24 of the leaf spring 20 as measured from said neutral axis O—O. FIG. 3, indicating the cross sectional pattern of the leaf spring 20, sets forth the cross sections of a large number of fibers 26 and the resin 28 in which the fibers 26 are embedded. However, a particular notation for showing said resin 28 is omitted from the cross sectional view of FIG. 3 in order to indicate distinctly the positions of the individual fibers 26. Such notation is also omitted from FIG. 7 given below.

Figure 4:
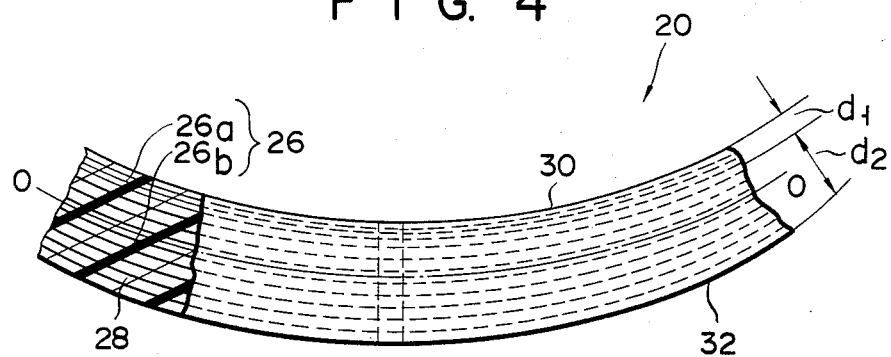
FIG. 4 is an enlarged cross sectional view on line 4—4 of FIG. 1.

FIG. 4 is a sectional view of the leaf spring 20 on line 4—4 of FIG. 1. The leaf spring 20 comprises a large number of continuous fibers 26 and the resin section 28 in which said fibers 26 are embedded. The resin section 28 is prepared from thermosetting resin such as unsaturated polyester resin, epoxy resin, or vinyl ester. The continuous fibers 26 are generally made of glass. In some cases, however, said fibers 26 are formed of carbon. The fibers 26 continuously extend lengthwise from end to end of the leaf spring 20. That portion $d_1$ of the leaf spring 20 which lies near the surface 30 and undergoes a great tensile stress is formed of fine fibers 26a in order to elevate the durability of the leaf spring 20. In contrast, fibers 26b of diameters larger than those of the aforesaid section $d_1$ are embedded in the section $d_2$ of the leaf spring 20 which is subjected to a relatively small tensile strength (that section which is defined between said $d_1$ section and neutral section O—O). The application of such larger diameter fibers 26b is intended to facilitate the fiber arrangement and resin impregnation and also elevate the high temperature durability of the leaf spring 20.

The fibers 26a and 26b which are respectively arranged in larger and smaller circles in FIG. 3 are formed of a plurality of bundled or twisted finer fibers. The fibers used to provide the FRP leaf spring have an extremely small diameter ranging from 10 to 30 microns. In actual application, therefore, the fiber is used in the form of a strand constructed by bundling hundreds of extremely fine fibers, or in the form of a fibrous bundle (referred to as roving) constructed by twisting together several or scores of such strands. Larger circles shown in the cross sectional view of FIG. 3 denote strands or rovings of fibers of larger diameter. Smaller circles indicated in FIG. 3 represent strands or rovings of filaments of smaller diameter. For briefness, the following description simply refers to fibers of larger and smaller diameters.

FIG. 4 is a side view of the leaf spring 20. The left portion of the leaf spring 20 is partly shown in a section parallel to the drawing. FIG. 4 shows finer fibers 26a and larger diameter fibers 26b embedded in the resin 28 in a state curved along a plane parallel to the drawing. The notation O—O denotes the neutral axis of the leaf spring 20. The other portion of the leaf spring 20 than that which is indicated by the aforesaid sectional view is set forth in an externally observed state. The finer fibers 26a and larger diameter fibers 26b are both shown in broken lines.

With the embodiment of FIGS. 3 and 4, the partial thickness measurement $d_1$ of the leaf spring 20 is chosen to be substantially half the distance between the neutral axis O—O and the uppermost surface 30. The region indicated by the notation $d_1$ contains fine fibers 26a having a diameter smaller than 15 microns, or preferably approximating 10 microns. The regions other than that of $d_1$ involve fibers 26b having a diameter larger than about 20 microns.

Figure 5:
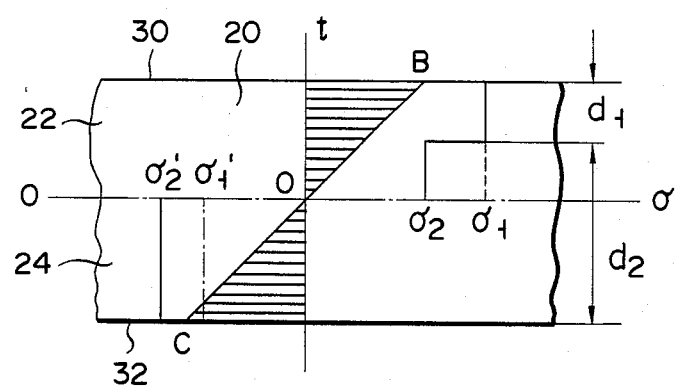
FIG. 5 is a chart showing the relationship between the magnitude of compression stress occurring in the leaf spring of FIG. 1 and the limit of fatigue observed therein.

FIG. 5 shows the relationship between a stress occurring within the leaf spring 20 of FIGS. 3 and 4 and the fatigue limit observed in the various sections thereof when a downward-acting load is applied to both ends of said leaf spring 20 with the central portion thereof supported. Since FIG. 5 is a sufficiently enlarged view, the uppermost surface 30, lowermost plane 32 and neutral axis O—O are all indicated in straight lines. FIG. 5 sets forth an abscissa showing a stress $\sigma$ and which extends coaxially with the neutral axis O—O, and also an ordinate denoting a distance t between said neutral axis O—O and a given point on an inclined line BC. In FIG. 5, a solid straight line $\sigma = \sigma_1$ drawn in a section corresponding to the aforesaid partial thickness measurement $d_1$ represents a fatigue limit observed on the various points of said $d_1$ portion. A solid straight line $\sigma = \sigma_2$ drawn between the neutral axis O—O and said $d_1$ portion denotes a fatigue limit observed on the various points of a portion defined between said neutral axis O—O and $d_1$ portion. A solid inclined line OB shown in FIG. 5 denotes the distribution of tensile stress when the leaf spring 20 undergoes the aforesaid load. A solid inclined line OC indicated in FIG. 5 represents the distribution of compression stress when the leaf spring 20 is subjected to said load. Both stresses are reduced to zero on the neutral axis O—O and gradually increase as they are more removed from said neutral axis O—O.

The tensile stress reaches a maximum level on the uppermost plane of the leaf spring 20 and the compression stress reaches a maximum level on the lowermost plane of said leaf spring 20.

With the embodiment of FIGS. 3 and 4, the tensile stress (O—B line) actually occurring in the leaf spring 20 is smaller than the aforesaid fatigue limits $\sigma_1$, $\sigma_2$ regardless of the distance between the neutral axis O—O and a given point at which the tensile stress occurs (namely, said O—B line is drawn on the left side of said fatigue limits $\sigma_1$, $\sigma_2$). The magnitude of tensile stress actually occurring in the leaf spring 20 is expressed by a distance between a given point on the inclined straight line OB and the corresponding point on the straight line Ot. The tensile stress occuring in the uppermost portion $d_1$ is smaller than the fatigue limit $\sigma_1$, and the tensile stress occurring in a region defined between the neutral axis O—O and said uppermost portion $d_1$ is smaller than the fatigue limit $\sigma_2$. It is seen, therefore, that the leaf spring according to the embodiment of FIGS. 3 and 4 has a sufficiently great durability to withstand a load corresponding to the repeated application of the above-mentioned tensile stress.

To assure a sufficient durability of the leaf spring 20 against a repeated application of a load, it is advised that the magnitude of the resultant tensile stress distributed along the inclined straight line OB of FIG. 5 be chosen to be smaller than the fatigue limit $\sigma_1$. The fibers embedded in the leaf spring 20 may be arranged in a different manner from that which is illustrated in FIGS. 3 and 4, provided that the above-mentioned requirement is satisfied. Referring to FIG. 5, $\sigma_1'$ (a 2 dot-dash line) given on the left side of line Ot denotes the fatigue limit of the leaf spring containing finer fibers when compressed, and $\sigma_2'$ (a solid line) represents the fatigue limit of the leaf spring containing thicker fibers when compressed. A distance between a given point on line OC and the corresponding point on line Ot indicates the magnitude of compression stress actually occurring on said given point on line OC. Namely, the magnitude of compression stress varies in accordance with the depth of said given point on line OC as measured from the neutral line O—O. As mentioned above, larger diameter fibers are embedded in that portion of the leaf spring 20 to which compression stress is applied. Since the compression stress applied to the leaf spring 20 is smaller than $\sigma_2'$ (fatigue limit), the leaf spring 20 has sufficient durability against compression stress. The notation $\sigma_1'$ of a 2 dots-dash line is given to show that if finer fibers happen to be embedded in that portion of the leaf spring 20 to which compression stress is applied, then the compression stress grows greater locally than the fatigue limit $\sigma_1'$, causing the leaf spring 20 to start breaking at the defective portion.

Description will now be given with reference to FIGS. 6 to 10 of the various arrangements in which fibers are embedded in the leaf spring 20. The actual arrangement of fibers is omitted from FIGS. 6, 8 and 9, in which fibers having different diameters are embedded in those portions of the leaf spring 20 which are divided by a broken line or broken lines.

Figure 6:
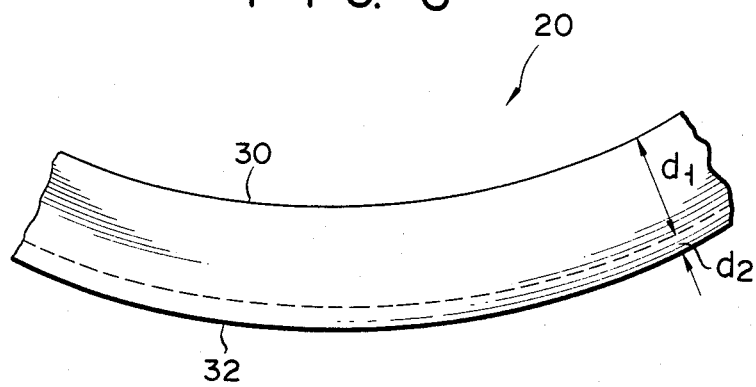
FIGS. 6, 7, 8, 9 and 10 respectively show a side view, cross sectional view, side view, side view and plan view of FRP leaf springs according to different embodiments from that of FIGS. 3 and 4.

With an FRP leaf spring 20 of FIG. 6, finer fibers are embedded in a wider thickness region $d_1$ and larger diameter fibers are embedded in a narrower thickness region $d_2$. The leaf spring 20 of FIG. 6 has great durability and, even when applied at an elevated temperature, prevents the buckling of fibers and avoids a decline in durability. It is advised that the magnitudes of the aforementioned thicknesses $d_1$, $d_2$ be properly defined with consideration given to the durability of fibers at normal temperatures and that of said fibers at elevated temperature, which generally varies with the object to which the leaf spring is actually applied.

Description will now be given with reference to the cross-sectional view of FIG. 7 of an FRP leaf spring 20 according to another embodiment of this invention. With this embodiment, finer fibers are embedded in those portions of the leaf spring 20 which lie nearer to the upper plane 30 thereof, and larger diameter fibers are embedded in those portions of the leaf spring 20 which lie nearer to the lower plane 32 thereof. The FRP leaf spring 20 of FIG. 7 also has suitable durability against compression stress when applied at elevated or normal temperature.

Figure 8:
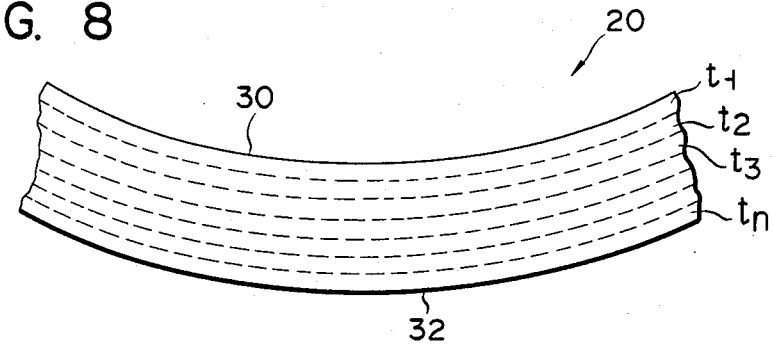

Description will now be given with reference to FIG. 8 of an FRP leaf spring 20 according to an embodiment similar to that of FIG. 7. The thickness of an FRP leaf spring 20 of FIG. 8 is divided into a plurality regions $t_1$, $t_2$, $t_3$, ..., $t_n$. Finer fibers are embedded in regions lying nearer to that portion of the leaf spring 20 to which a tensile stress is applied, while larger diameter fibers are embedded in the region lying nearer to that portion of the leaf spring 20 to which a compression stress is applied. The FRP leaf spring 20 of FIG. 8 has substantially the same function as that of FIG. 7.

Figure 9:
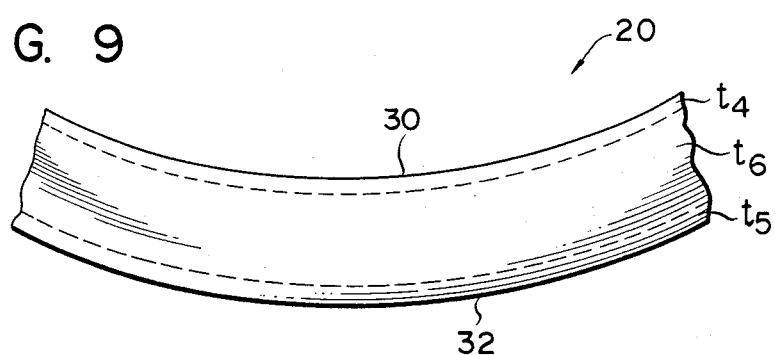

Description will now be given with reference to FIG. 9 of an FRP leaf spring 20 according to still another embodiment of the invention. The thickness of the leaf spring 20 of FIG. 9 is divided into two thinner regions $t_4$, $t_5$ respectively lying near the upper plane 30 and lower plane 32, and an intervening thicker region $t_6$. The leaf spring 20 of FIG. 9 may be elevated in durability at room temperature due to finer fibers being embedded in the two thinner regions $t_4$, $t_5$, or ensure high temperature durability against the compression stress by embedding larger diameter fibers in the two thinner regions $t_4$, $t_5$. The FRP leaf spring of FIG. 9 exhibits an excellent function in such an application as causes the front and back sides of the leaf spring 20 to undergo tensile and compression stresses alternately.

Figure 10:
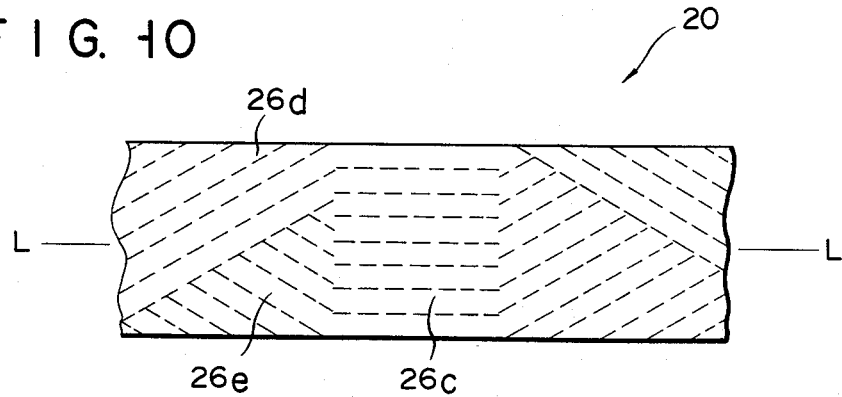

Description will now be given with reference to FIG. 10 showing the plan view of a leaf spring having a similar shape to that of FIG. 3 and FIG. 4. A plurality of fibers 26c are embedded along the lengthwise direction L—L of the leaf spring 20 and two groups 26d, 26e of fibers are embedded in an inclined state to the lengthwise direction. If, with the embodiment of FIG. 10, fibers are embedded with the thickness defined according to that thickness region of the leaf spring 20 in which they are embedded as described in FIGS. 1 to 9, then the same effect as previously mentioned is ensured. When the leaf spring 20 happens to be twisted around a lengthwise line L—L, the above-mentioned arrangement is effective in increasing the durability of said leaf spring 20. Fibers extending in three directions are indicated by broken lines in FIG. 10. However, fibers 26c extending lengthwise of the leaf spring 20 may be omitted depending on the object to which the leaf spring 20 is applied.

An FRP leaf spring embodying this invention in which continuous fibers are embedded with such a thickness as corresponds to the depth of the leaf spring in which they are laid, offers the advantages that: the leaf spring maintains high durability at both normal and elevated temperatures, simultaneous application of finer and larger diameter fibers require a smaller overall number of fibers than when finer fibers alone are used; facility is assured in the handling and stranding of fibers and the selective arrangement of fibers having different diameters in accordance with the positions of those portions of the leaf spring in which they are embedded, resin is easily impregnated between the fibers, and speedy continuous manufacture of an FRP loop for making a leaf spring is possible.

What is claimed is:

1. An FRP leaf spring which comprises a plurality of continuous fibers arranged to extend within a number of adjacent thickness ranges of the leaf spring, and a resin in which said plural continuous fibers are embedded, said continuous fibers being of such diameter as corresponds to the position of that thickness range of the leaf spring in which said fibers are embedded, wherein the fibers in each of said thickness ranges have a diameter which is different from the diameters of the fibers in a next adjacent thickness range.

2. An FRP leaf spring which comprises a plurality of continuous fibers arranged to extend within a number of adjacent thickness ranges of the leaf spring, and a resin in which said plural continuous fibers are embedded, said continuous fibers being of such diameter as corresponds to the position of that thickness range of the leaf spring in which said fibers are embedded, wherein the continuous fibers embedded in that thickness range of the leaf spring to which a tension stress is applied are chosen to have a smaller diameter than those which are embedded in the other thickness ranges of the leaf spring.

3. The FRP leaf spring according to claim 2, wherein the continuous fibers embedded in that thickness ranges of the leaf spring to which a compression stress is applied are chosen to have a greater diameter than those which are embedded in the other thickness range of the leaf spring.

4. The FRP leaf spring according to claim 1, wherein the continuous fibers embedded in that thickness range of the leaf spring to which a tension stress is applied are chosen to have a smaller diameter, and the continuous fibers embedded in that thickness range of the leaf spring to which a compression stress is applied are chosen to have a greater diameter, and the continuous fibers embedded in a thickness range of the leaf spring which is positioned intermediate between said tension stress range and said compression stress range are chosen to have such diameter as is defined to be intermediate between that of the continuous fibers embedded in the tension stress range and that of the continuous fibers embedded in the compression stress range.

5. The FRP leaf spring according to claim 1, whose thickness is divided into a plurality of layers, and wherein finer fibers are embedded in that layer of the leaf spring which lies nearer to the surface of the leaf spring to which a tension stress is applied.

6. The FRP leaf spring according to claim 1, wherein the continuous fibers embedded in those thickness ranges of the leaf spring which respectively extend from front and back surfaces of the spring at a prescribed distance are chosen to have a smaller diameter than the diameters of the continuous fibers embedded in an intermediate thickness range.

7. The FRP leaf spring according to claim 1, wherein the continuous fibers embedded in those thickness ranges of the leaf spring which respectively extend from front and back surfaces of the spring at a prescribed distance are chosen to have a greater diameter than the diameters of the continuous fibers embedded in an intermediate thickness range.

8. The FRP leaf spring according to claim 1, wherein the continuous fibers embedded in a narrower thickness range of the leaf spring to which a compression stress is applied are chosen to have a greater diameter, and the continuous fibers embedded in the remaining thickness range of the leaf spring are chosen to have a smaller diameter.

9. The FRP leaf spring according to claim 1, wherein the continuous fibers are embedded in a state symmetrically inclined to the lengthwise direction of the leaf spring.

10. The FRP leaf spring according to claim 1, wherein the continuous fibers are embedded in a state extending lengthwise of the leaf spring.

* * * * *

UNITED STATES PATENT AND TRADEMARK OFFICE
CERTIFICATE OF CORRECTION

PATENT NO. : 4,530,490

DATED : July 23, 1985

INVENTOR(S) : Atsushi MISUMI, et al.

It is certified that error appears in the above-identified patent and that said Letters Patent is hereby corrected as shown below:

Column 6, line 36, the word "ensure" should read --may ensure--.

Column 7, line 33, the word "ranges" should read --range--;
        line 36, the word "range" should read --ranges--.

Signed and Sealed this

Twenty-first Day of January 1986

[SEAL]

Attest:

DONALD J. QUIGG

Attesting Officer     Commissioner of Patents and Trademarks